United States Patent [19]

MacDonald et al.

[11] Patent Number: 5,019,959
[45] Date of Patent: May 28, 1991

[54] BALLAST CIRCUIT

[75] Inventors: Ralph R. MacDonald; William M. Menger, both of Houston, Tex.

[73] Assignee: Innovative Controls, Inc., Houston, Tex.

[21] Appl. No.: 245,823

[22] Filed: Sep. 19, 1988

[51] Int. Cl.$^5$ ............................................. H02M 7/537
[52] U.S. Cl. ..................................... 363/134; 363/17; 315/105
[58] Field of Search .................. 363/16, 17, 24, 25, 363/26, 39, 40, 132, 133, 134; 315/205, 207, 209 R

[56] References Cited

U.S. PATENT DOCUMENTS

| | | | |
|---|---|---|---|
| 4,045,711 | 8/1977 | Pitel | 315/209 R |
| 4,259,614 | 3/1981 | Kohler | 363/133 X |
| 4,274,033 | 6/1981 | Nuckolls | 315/207 X |
| 4,276,496 | 6/1981 | Arena-Ochoa | 315/206 |
| 4,370,600 | 1/1983 | Zansky | 315/209 R X |
| 4,388,563 | 6/1983 | Hyltin | 315/205 |
| 4,392,087 | 7/1983 | Zansky | 315/219 |
| 4,475,064 | 10/1984 | Burgess | 315/187 X |
| 4,538,093 | 8/1985 | Melai | 315/205 X |
| 4,679,129 | 7/1987 | Sakakibara et al. | 363/17 |
| 4,686,614 | 8/1987 | Costello | 363/17 |

FOREIGN PATENT DOCUMENTS 2170663 8/1986 United Kingdom ................ 363/16

Primary Examiner—Patrick R. Salce
Assistant Examiner—Kristine Peckman
Attorney, Agent, or Firm—Dodge, Bush & Moseley

[57] ABSTRACT

A ballast circuit for a discharge tube such as a fluorescent tube, mercury vapor, sodium vapor or metal halide lamp is disclosed. D.C. power is provided alternately between two output driver stages and an a.c. neutral return line. In output transformerless (OTL) embodiments of the invention, a series connection of a reactance circuit and the tube is connected between the push pull point and the a.c. neutral return line. In transformer embodiments of the invention, a primary winding of a transformer is connected in series with the reactance circuit. The tube or load is connected across an output winding of the transformer with the electrical effect that the load is in series with the reactance circuit. Alternative arrangements of transformer input windings are provided. The first includes two input primary windings wound in opposite directions with the circuit arranged such that current flows in one or the other of the input transformer windings on alternating half cycles of the control signal. The second includes a single input primary winding, but current flows through it in opposite directions on alternating half cycles. The d.c. current is provided by first and second rectifiers which provide positive and negative voltage levels with respect to an a.c. neutral line. RFI reduction circuitry is provided with the ballast circuit.

45 Claims, 8 Drawing Sheets

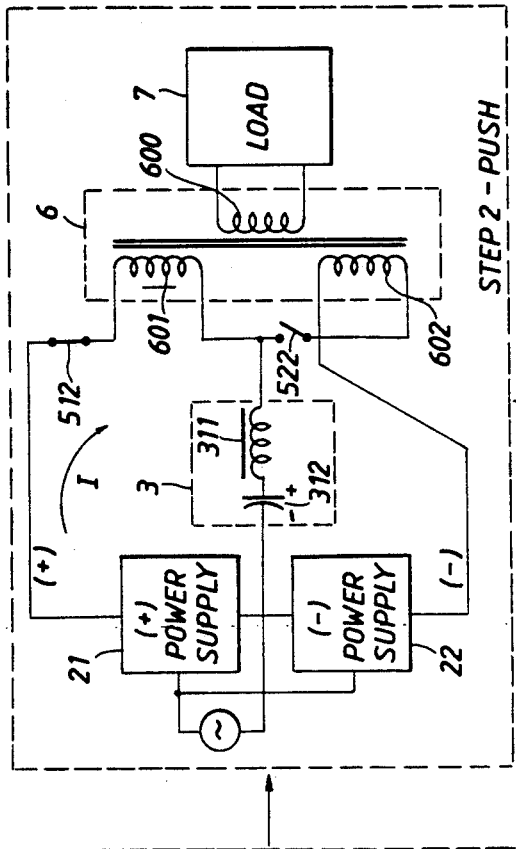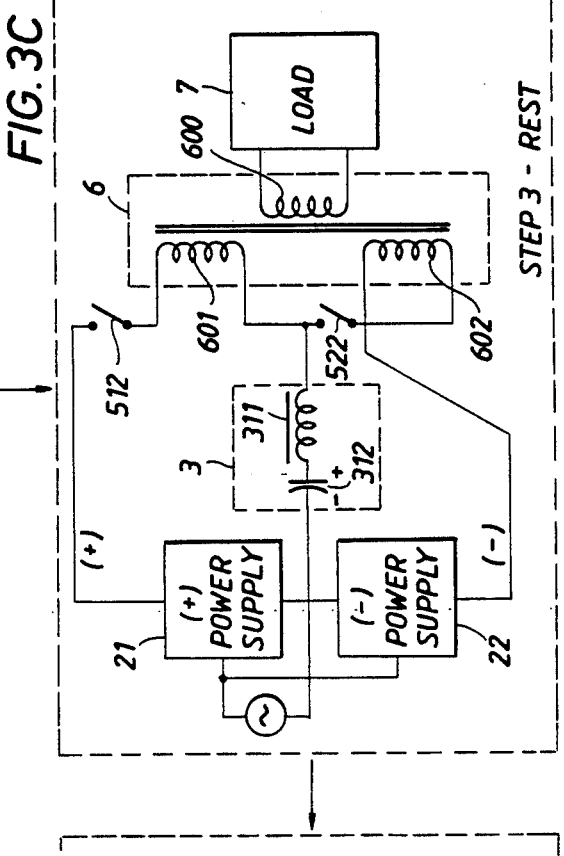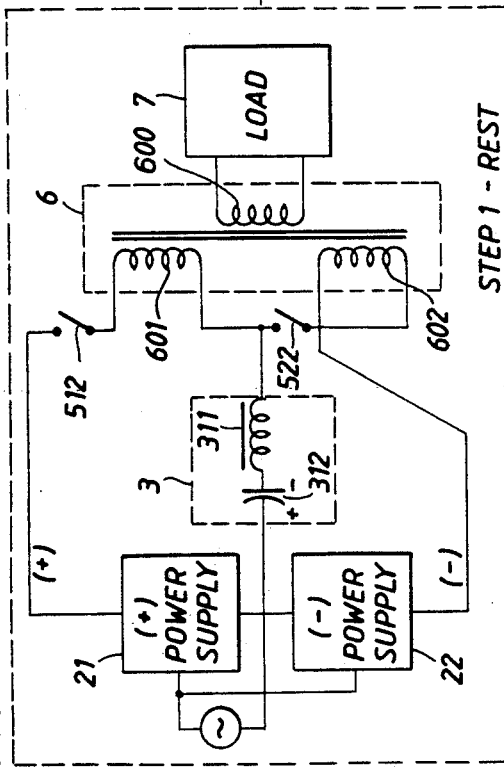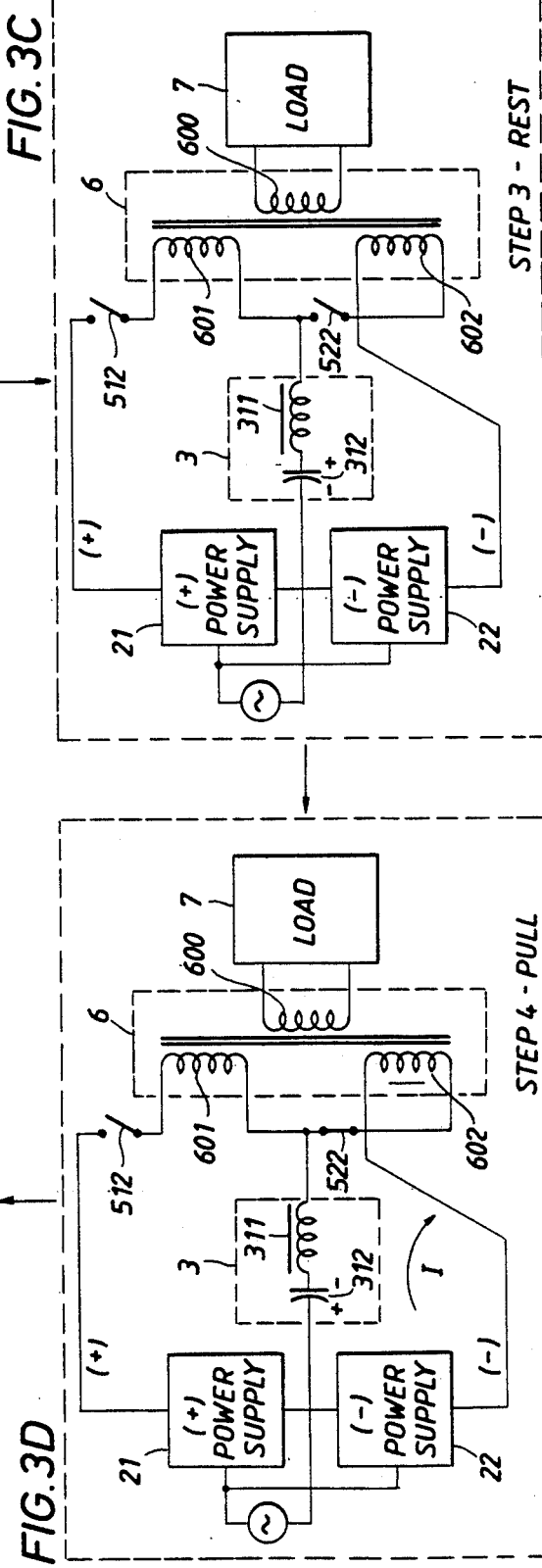

BALLAST CIRCUIT

BACKGROUND OF THE INVENTION

1. Field of the Invention

This invention relates in general to a ballast circuit for a discharge tube and in particular to a high frequency electronic power supply and ballast circuit for a fluorescent tube.

2. Description of the Prior Art

High speed switching solid-state electronic power supplies and ballasts can be designed to be smaller, lighter and more efficient than conventional core and coil transformers and ballasts designed for the same end use. They work by converting a.c. to d.c., then switching the d.c. at speeds much higher than the original a.c.. These highers speeds, between 30 and 30,000 times the incoming frequency, permit a drastic reduction in the size and weight of the magnetic components such as inductors and transformers.

There are numerous examples of prior art electronic ballast circuits for discharge tubes. For example, U.S. Pat. No. 4,370,600 issued Jan. 25, 1987, to Zansky concerns a two-wire electronic dimming ballast for fluorescent lamps. Filaments of the lamps are supplied by auxiliary coils of an inductor connected in series with a capacitor in a series resonant bridge inverter. The power to the lamps is supplied via such capacitor.

U.S. Pat. No. 4,392,087 issued July 5, 1983 to Zansky concerns a two-wire electronic dimming ballast circuit for gaseous discharge lamps which illustrates at FIG. 6 a positive feedback self-oscillating circuit for switching rectified d.c. voltage to the primary of a transformer. A tuning capacitor is connected across the main secondary winding. The system provides a sine wave input at the natural oscillating frequency of a half-bridge inverter circuit as determined by the leakage inductance of the main secondary winding and the tuning capacitor. FIGS. 7 and 8 of the '087 illustrate alternative embodiments of the circuit of FIG. 6.

U.S. Pat. No. 4,045,711 issued Aug. 30, 1977 to Pitel illustrates another tuned oscillator ballast circuit, but a series inductive winding and capacitor are provided in the input of a transformer which are series resonant at the oscillating frequency.

While the electronic ballast circuits described above as well as others have certain advantages, their effectiveness in striking and thereafter regulating the current applied to a discharge tube such as a fluorescent bulb has been less than ideal. For example, such circuits have not been ideally effective in reducing RFI/EMI generated by the HID or fluorescent bulb.

IDENTIFICATION OF OBJECTS OF THE INVENTION

It is therefore an object of this invention to provide an improved solid-state high speed ballast circuit for high intensity discharge (HID) and fluorescent bulbs.

It is another object of this invention to provide an improved circuit for reducing RFI/EMI in solid-state electronic push-pull power supplies and ballasts by a symmetrical design using the a.c. neutral bus, rather than ground, as the principal signal return path for RFI/EMI.

It is yet another object of the invention to provide for control of the output of the push-pull output stage by using a series or parallel reactive filter which provides an a.c. path between the AC neutral bus and the push-pull common point.

It is another object of the invention to provide an improved design for a high-speed switching power supply and ballast circuit wherein no special low voltage power supply is required for solid state elements in the power supply or ballast.

SUMMARY

The objects identified above, as well as other advantages and features of the invention are achieved in a circuit in which line voltage is rectified in two symmetrical power supplies: one for producing positive d.c. voltage between a positive d.c. line and an a.c. neutral line; and a second for producing negative d.c. voltage between a negative d.c. line and the a.c. neutral line. The a.c. neutral line is used as an RFI/EMI return bus.

An electronic control circuit powered from one of the power supplies is provided to generate a high frequency a.c. control signal having first and second half cycles. A first electronically controlled circuit responsive to the control signal effectively connects a load, such as a discharge tube, and a reactance circuit, such as a series connected inductor and capacitor, between the positive d.c. line and the a.c. neutral line only during the first half cycles of the high frequency a.c. control signal. A second electronically controlled circuit responsive to the control signal effectively connects the load and the reactance circuit between the negative d.c. line and the a.c. neutral line only during the second half cycles of the high frequency a.c. control signal.

In a transformerless embodiment of the invention, the first electronically controlled circuit includes a first electronically controlled switch connected between the positive d.c. line and a push pull point. A second electronically controlled switch is connected between the negative d.c line and the push pull point. A reactance circuit and a load is connected in series between the push pull point and the a.c. neutral line. Multiple reactance circuit — load series connections may be connected between the push pull point and the a.c. neutral line.

In a transformer embodiment of the invention, a reactance circuit, such as a series connected inductor and capacitor, is connected in series with the input of a transformer which has a load such as a discharge tube connected across its output. Such series connected reactance circuit and transformer winding is connected to the a.c. neutral line. The load is electrically effectively in series with the reactance circuit. The d.c. current is applied in a push-pull fashion across the series connection in response to a high frequency control signal having a first or "push" half cycle and a second or "pull" half cycle.

Alternative arrangements of the transformer input winding are provided. The first includes two input primary windings wound in opposite directions, and the circuit is arranged such that current flows in one or the other of the input transformer windings on alternating half-cycles of the control signal. The second arrangement includes a single input primary winding, but the circuit is arranged such that current flows through it in opposite directions on alternating half cycles.

BRIEF DESCRIPTION OF THE DRAWINGS

The objects, advantages and features of the invention will become more apparent by reference to the drawings which are appended hereto and wherein like numerals indicate like parts and wherein an illustrative embodiment of the invention is shown of which:

FIGS. 3A-3E illustrate in simplified form how the output power control circuit is connected functionally for the preferred embodiment shown in FIG. 2: FIG. 3A illustrates a beginning "rest" state; FIG. 3B illustrates current flow during a "push" state; FIG. 3C illustrates an intermediate "rest" state; FIG. 3D illustrates current flow during a "pull" cycle; and FIG. 3E illustrates a timing mode control diagram for each of the four states;

DESCRIPTION OF THE INVENTION

Figure 1:
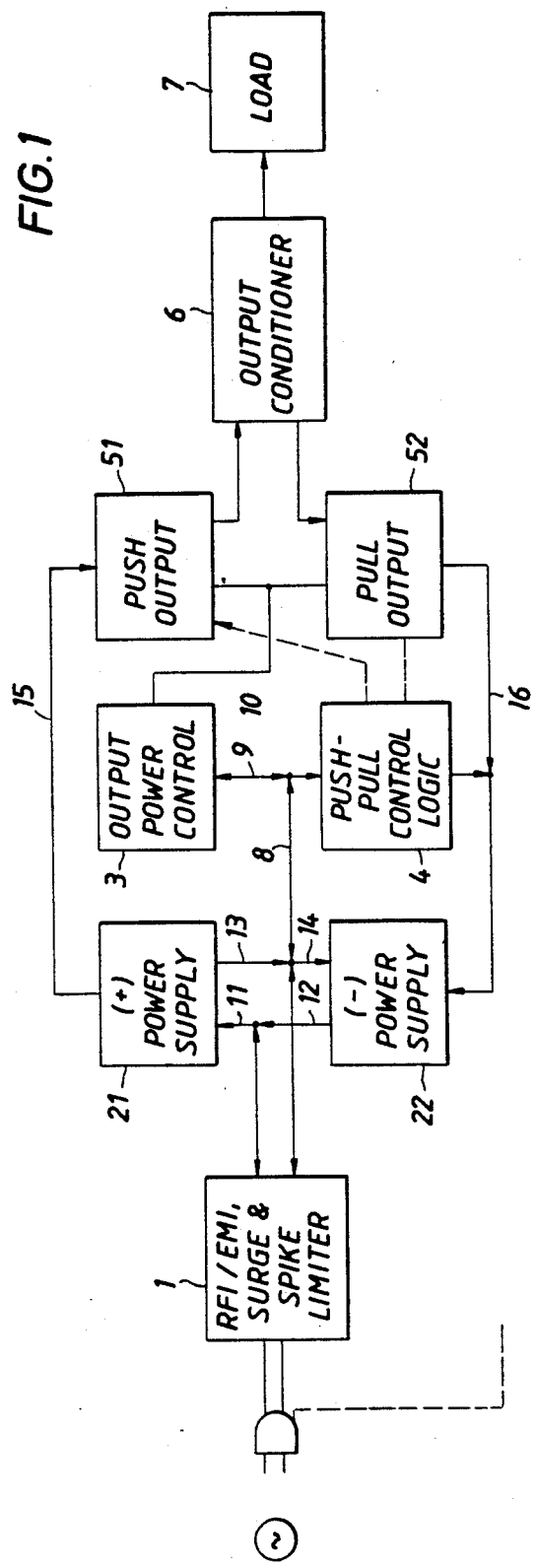
FIG. 1 is a block diagram illustrating the functional components of the circuit of the invention.

FIG. 1 illustrates in block diagram form the high speed switching ballast circuit of the invention. The block 1, labelled as "RFI/EMI, surge and spike limiter", functions to receive a.c. line power while simultaneously detecting overload and overheating and to isolate the ballast circuit when either overload or overheating is above allowable limits. The circuit of block 1 also detects high voltage spikes and prevents damage to the ballast circuit. The circuit of block 1 also serves to remove any remaining RFI (radio frequency interference)/EMI (electro magnetic interference) from the line.

The positive power supply 21 functions to supply d.c. positive voltage between positive d.c. line 15 and a.c. neutral line 8 by rectifying a.c. voltage between a.c. high line 11 and a.c. neutral line 8. The negative power supply 22 functions to supply d.c. negative voltage between negative d.c. line 16 and a.c. neutral line 8 by rectifying a.c. voltage between a.c. high line 11 and a.c. neutral line 8. It also functions in the preferred embodiment of the ballast circuit to provide d.c. voltage to power push-pull control logic circuit 4, although the positive power supply 21 could alternatively be employed to power such control logic circuit 4.

Output power control circuit 3, connected alternately in series with push output circuit 51 and pull output circuit 52 to neutral a.c. line 8, functions to regulate the output power by insertion of a passive reactive impedance or tuned circuit at the "pivot-point" of the push-pull output stages 51 and 52. A very low impedance will over drive the output while a high impedance will under drive it. Output wave shape is a direct result of the impedance selection, also. A pure capacitive impedance causes a steep wave front in output current, while a pure inductive impedance causes a gradual wavefront rise. By judicious selection of elements of the circuit 3 and unit operating frequency, the output power level and its wave shape may be selected for any particular load.

The push-pull control logic circuit 4 functions to select the operating mode of push output circuit 51 and pull output circuit 52 at any point in time. The preferred embodiments shown below both use an oscillator circuit as the push-pull control for current flowing in an input transformer winding having an output winding for supplying high frequency output power to the load.

The output circuit 51 functions to drive the "push" portion of the output. It provides its portion of the output to the output conditioner circuit 6 during the "push" half of the output cycle. During this period, the pull output circuit 52 is effectively an open circuit, and the current return path from positive power supply 21 through push output circuit 51 is through output power control circuit 3 to a.c. neutral line 8.

The output circuit 52 functions to drive the "pull" portion of the output. It provides its portion of the output to the output conditioner circuit 6 during the "pull" half of the output cycle. During this period, the push output circuit 51 is effectively an open circuit, and the current flow is from neutral bus 8 through output power control circuit 3 to pull output circuit 52 and then to negative power supply 21.

Output conditioner circuit 6 functions to convert the output from push output 51 and from pull output 52 to the output voltage appropriate to serve load 7.

Load 7 can be any load appropriate for a high speed switching power supply. For the preferred embodiment illustrated in FIG. 2, the load is a pair of fluorescent bulbs, but other discharge tubes such as mercury vapor, sodium vapor, or metal halide lamps may advantageously be the load. Indeed, the load may be virtually any known a.c. electrical load (or, by using output rectifiers, virtually any known d.c. electrical load).

The neutral bus 8 serves to bring the incoming a.c. power line neutral past the two d.c. power supplies 21, 22 in order that it may supply a path for current flow to output power control circuit 3 and also function as an RFI/EMI signal return path.

Transformer Embodiments of the Invention

Figure 2:
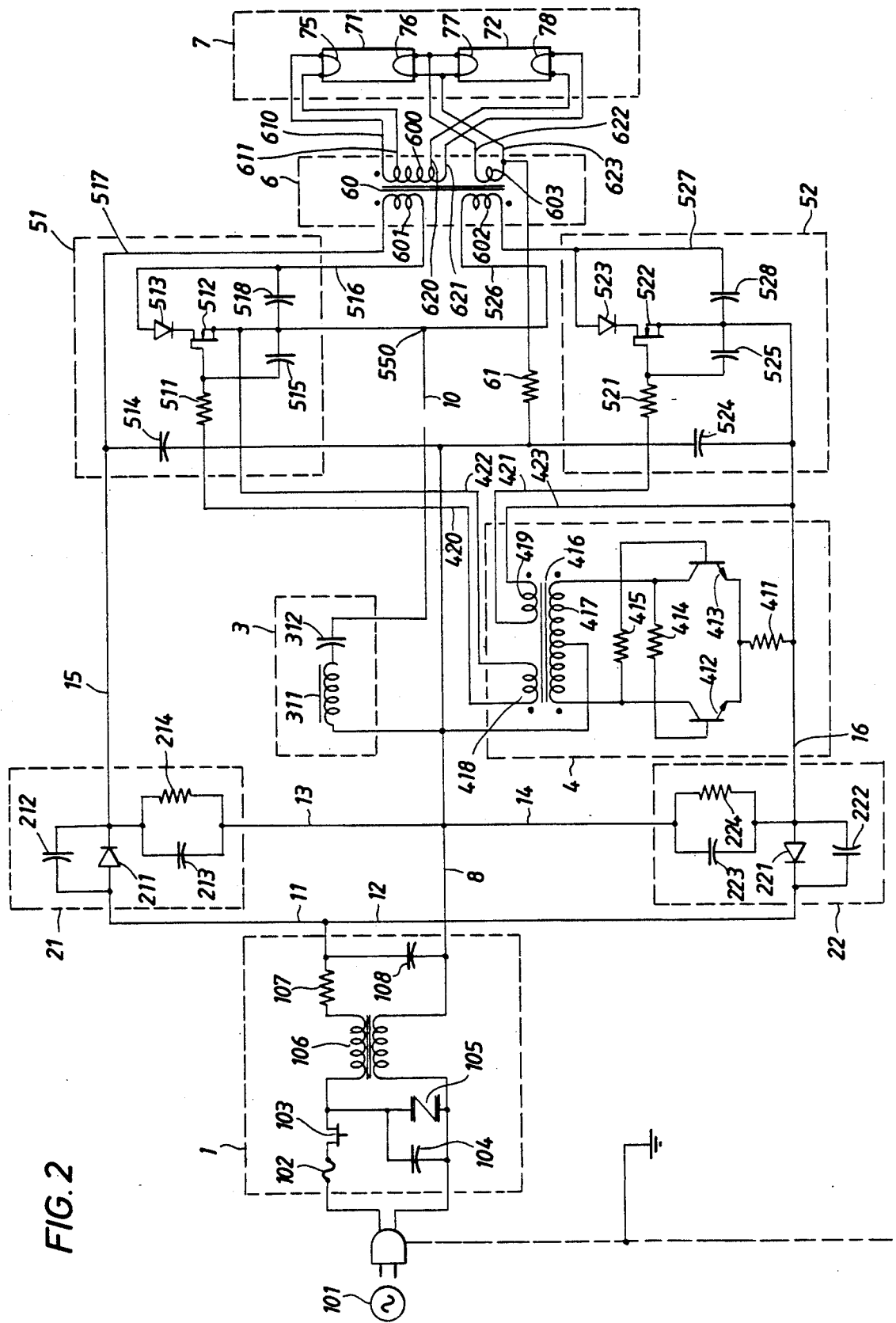
FIG. 2 is a circuit diagram of one of the transformer embodiments of the invention which provides a series L-C circuit as the output power control circuit and provides its output to two fluorescent lamps.

FIG. 2 shows one of the preferred alternative "transformer" embodiments of the invention. It serves as a power transfer or ballast circuit to operate two fluorescent lamps. Despite the well understood difficulties of operating HID and fluorescent lamps during strike-off, warm-up and operation, the circuit of FIG. 2 (and the circuit of FIG. 6) functions well at all such operational stages of a discharge tube, such as a fluorescent bulb. Output power control circuit 3, comprising a reactance circuit, limits the output during the very critical warm-up period while allowing full power output during normal operation.

A.C. power source 101 delivers power input to the unit through fuse 102 and thermal cutout 103. Capacitor 104 is connected across the a.c. line input to provide a low impedance shunt to high frequency noise, RFI and spikes. Metal oxide varistor 105 is connected across the a.c. line input to remain dormant during normal voltage variations, but it becomes active during input voltage surges or spikes by providing a momentary short circuit path for an over-voltage condition.

The RFI filter transformer 106 functions to reduce RFI by providing a high impedance path to RFI while offering little impedance to power line frequencies. Resistor 107 and capacitor 108 are connected between RFI filter transformer 106 and the two power supplies 21 and 22. They serve to provide a low impedance path to RFI on the power supply side of the filter. The RFI filter transformer 106 alternatively may be placed downstream of diodes 211 and 221 of power supply circuits 21 and 22. Under certain circumstances, such alternative placement of RFI filter 106 may improve the effective power factor of the circuit (as described below) as well as aid the RFI/EMI filtering function effectively.

The power supply 21 receives input a.c. power via lines 11 and 13 and rectifies it with rectifier diode 211. The rectified a.c. is filtered by capacitor 213, and appears as positive d.c. voltage on line 15 which is applied to push output circuit 51 via lines 8 and 15 and output control reactance circuit 3. The diode 211 of positive power supply 21 has capacitor 213 connected across it so as to minimize switching transients. Capacitor 214 has resistor 214 connected across it to bleed off voltage when the unit is turned off.

Negative power supply 22 is similar to positive power supply 21. It receives a.c. input power through lines 12 and 14 and rectifies it with rectifier diode 221. The rectified a.c. is filtered by capacitor 223 and conveyed as negative d.c. voltage on line 16 with respect to a.c. neutral line 8. The current path from line 8 to pull output circuit 52 is through output power control or reactance circuit 3. Diode 221 has capacitor 222 connected across it to minimize switching transients. Capacitor 223 has resistor 224 connected across it to bleed off voltage when the unit is turned off.

Push pull control logic circuit 4 is a free running oscillator receiving d.c. power through lines 16 and 8, through resistor 411 and the center tap of primary winding 417 of transformer 416. The oscillator includes transistors 412 and 413 and resistors 414 and 415 cross connected so that the gain of transistors 412 and 413 and positive feedback through resistors 414 and 415 allow oscillation. Output control signals are conveyed from output winding 418 to push output circuit 51 via lines 420 and 422 and from output winding 419 to pull output 52 through lines 421 and 423. The oscillator of push pull control logic circuit 4 operates at a frequency of oscillation determined by the inductance of transformer 416. An operating frequency of 20–30 KHz is preferred. A 24 volt peak to peak sinusoidal output voltage appearing both on windings 418 and 419 is preferred, each voltage being one hundred eighty degrees out of phase from each other, because windings 418 and 419 are oppositely wound from each other.

Output power control circuit 3 provides the path for operating current to push and pull output circuits 51 and 52. Because transistors 512 and 522 are never turned on simultaneously, there is no continuous d.c. path for current to flow from positive d.c. voltage on line 15 to line 8 (a.c. neutral) or negative d.c. voltage on line 16 when the embodiment of output power control 3 includes series capacitor 312. This capacitor 312 helps to limit the amount of current flow in either direction; consequently, the operating frequency of push-pull control logic oscillator 4 and the size of capacitor 312 together with inductor 311 determine the output power of the unit.

Figure 3E:
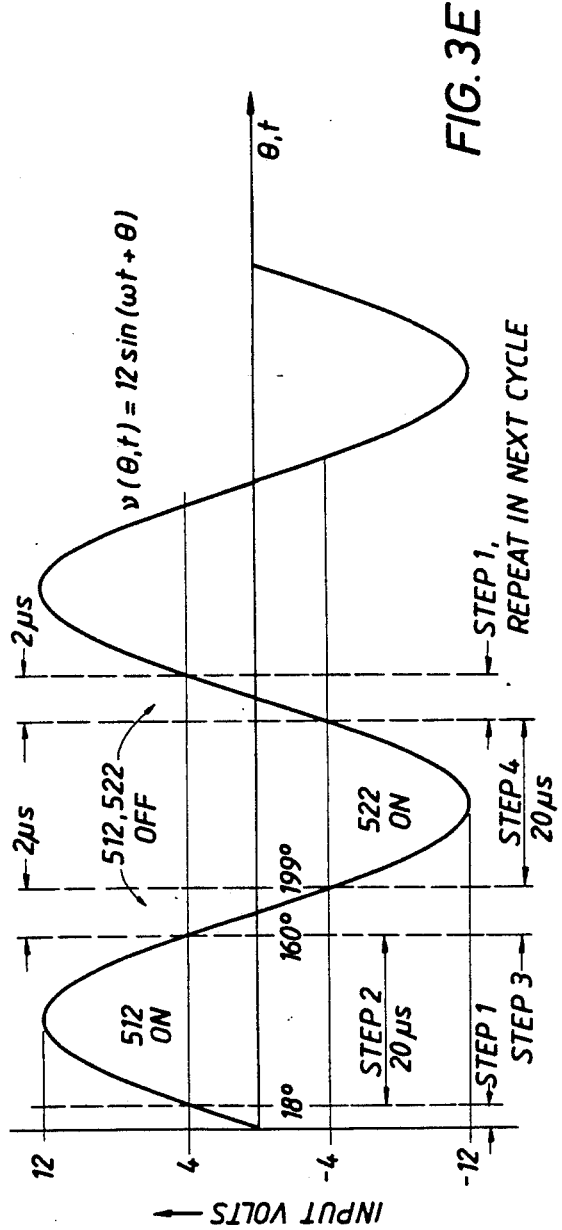

Push output circuit 51 receives its on-off control signal from push pull control logic circuit 4 via lines 420 and 422. Transistor 512 is turned on by the positive going signal on line 420 through resistor 511 shortly following the time transistor 522 is turned off by the negative going signal on line 421 through resistor 521. This is illustrated in FIG. 3E. Diode 513 provides added protection against the large reverse voltage produced when transistor 512 is turned off. Capacitors 514, 515 and 518 reduce switching transients, and help provide a high frequency roll-off characteristic to the output stage. All three capacitors 514, 515 and 518 are optional and are not essential to the operation of the circuit.

Pull output circuit 51 receives its on-off control signal via lines 421 and 423. The signals across coils 418 and 419 are 180° out of phase with each other. Consequently, transistor 522 is turned on by the positive going signal on line 421 through resistor 521 shortly following the time transistor 521 is turned off by the negative going signal on line 420 through resistor 511. Diode 523 provides added protection against the large reverse voltage produced when transistor 522 is turned off. Capacitors 524, 525 and 528 reduce switching transients. Capacitors 524, 525 and 528, are optional.

The conditioner circuit or transformer 6 receives input from push and pull outputs 51 and 52 through lines 516 and 517 and 526 and 527 respectively. These outputs are converted to the voltage appropriate to the load 7 by designing the number and type of windings in the primary and secondary of the transformer 6. For the preferred embodiment of the circuit of FIG. 2, resistor 61 is used to electrically tie the output back to a.c. neutral 8 in order to prevent stray field buildup in the load. Where the circuit is to be used as a ballast circuit, the load 7 is preferably a discharge tube or tubes such as two fluorescent tubes 71 and 72.

The time during which both transistor switches 512 and 522 are open or the "dead band" is an important feature in the power supply and ballast design of circuit 2. Dead band provides time for the magnetic flux of inductor 311 to reset from full saturation. Dead band time is provided in this embodiment as illustrated in FIG. 3E.

FIG. 3 illustrates in a simplified way how output power control circuit 3 functions to control power to push and pull outputs 51 and 52. There are three possible states that the circuit of FIG. 2 will assume when it is functioning properly. Such states include two conducting states and one off state which occurs twice during each running cycle. A running cycle comprises four steps.

From rest the circuit begins in the off state, Step 1 of FIG. 3A illustrates this condition where both output transistors 512 and 522 are off so that no current flows in either transformer winding or through the power control circuit 3.

Next, the push-pull control circuit 4 (FIGS. 1 and 2) excites transistor switch 512 into conduction and current flows as shown in FIG. 3B through primary winding 601. This winding is poised to force the magnetic flux field of the transformer 6 in one reference direction. This induces a voltage into the transformer's secondary winding 600 across load 7. Where load 7 is a discharge tube array, the voltage across load 7 is large so as to strike the tubes. Because the striking current is low, only small voltages appear across the power control reactances of circuit 3.

When the tubes 71, 72 of load 7 attempt to draw excessive current, such as during the warm-up time after fluorescent tubes of load 7 have been struck, this resistance is significantly lower than before they have been struck. Consequently, the current in primary windings 601 and 602 tries to increase, thereby forcing a larger voltage drop in the current and frequency dependent impedance of reactance circuit 3. Hence, wattless power is stored in the reactances of current control 3 given by, $$\dot{Q} = j[(V_c)^2 \omega C - (V_L)^2/\omega L] \quad (1)$$

where
$\dot{Q}$ is reactive volt — amperes
$V_c$ is volts across capacitor 312
$V_L$ is volts across inductor 311
C is capacitance in Farads of capacitor 312
L is inductance in Henries of inductor 311
$\omega = 2\pi$ f, where
f is frequency in Hertz
j is the reactive mathematical operator.

When transistor switch 512 is turned off by the push-pull control logic circuit 4, transistor switch 522 is held off simultaneously. This is the intermediate off state as shown in FIG. 3C. During this time, any residual gate charge in transistor 512 is sinked via the control logic circuit 4. Also the field in inductor 311 of current control circuit 3 is dissipated.

The control logic circuit 4 achieves dead time by generating a sinusoidal wave to drive the output transistor 512 and 522. The dead time occurs between the points on the driving wave where the voltage waveform magnitude is less than about four volts peak. The dead time in the present invention for the fluorescent tube ballast embodiment is approximately 2 μs in the preferred embodiment.

FIG. 3E illustrates the driving sinusoidal wave across one of the secondary coils of transformer 416 of the control logic circuit 4 and shows where the dead time is in effect.

Next, the push-pull control logic circuit 4 excites output transistor switch 522 into conduction, and current flows in primary winding 602 as shown in FIG. 3D. The winding 602 is wound in the opposite direction from that of winding 601 to force the magnetic flux field in transformer 6 in the opposite direction from that of Step 2. This action induces a voltage of opposite polarity in secondary 600 of transformer 6 across the load 7.

When the load attempts to draw too much current, the current in primary winding 602 tries to increase, forcing a voltage drop across the reactance of output power control 3. Wattless power is stored once again as given by Equation 1 and constant a.c. current is maintained by power control circuit 3.

Next, both transistor switches 512 and 522 are turned off and Step 1 of FIG. 3 becomes the next intermediate off state of dead time as illustrated in FIG. 3A.

FIG. 4 shows four embodiments for the reactance or current control circuit 3 of FIG. 1. Two of these use operation of the control logic circuit oscillator frequency by tuning the frequency of the series or parallel reactive circuit. The other two schemes employ energy storage in a capacitive or inductive reactance.

Figure 4A:
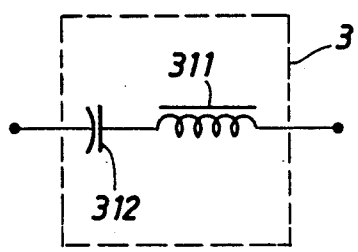
FIGS. 4A-4D illustrate alternative embodiments of the reactance circuits for output power control 3.
Figure 4A:
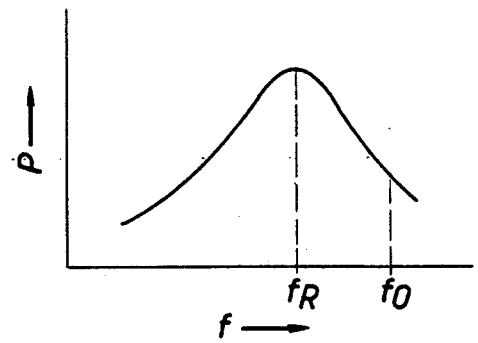

In FIG. 4A a series resonant L-C circuit is tuned a small amount below the operating frequency of the oscillator of control logic circuit 4. The resonant frequency of the L-C circuit is given by, $$f_{resonant} = \frac{1}{2\pi \sqrt{LC}}. \quad (2)$$

The power band of the oscillator of logic control circuit 4 is set in a portion of the filter's response in which the gain of the reactance circuit is a few decibels below the maximum transferable "Q" of the circuit. The response of the filter and associated operating drive frequency of the oscillator of control logic circuit is shown in FIG. 4A.

Figure 4B:
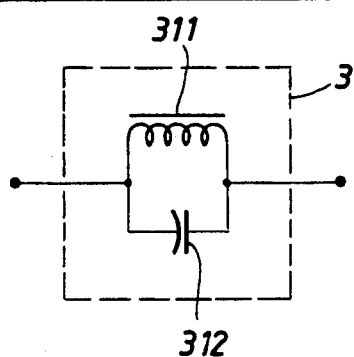
Figure 4B:
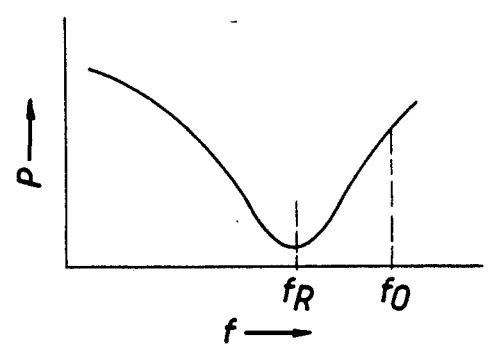

Another approach of limiting the current is to operate the drive frequency in the "pit" of a parallel tuned reactance circuit as shown in FIG. 4B. Its minimum power transfer is at the frequency given by equation (2). Operation slightly above the resonant frequency of the filter yields a value of reactive power stored of similar value to that of FIG. 4B.

Figure 4C:
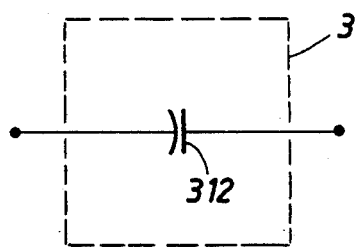
Figure 4C:
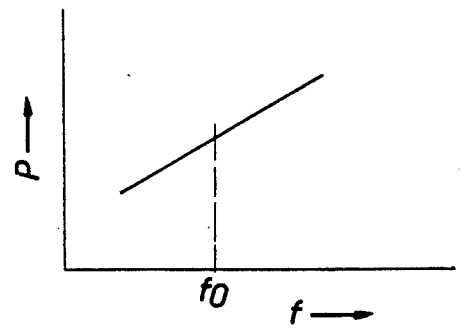

In FIG. 4C, power is limited strictly by capacitive reactance per the following equation, $$X_c = \frac{1}{\omega_o C} \quad (3)$$

where $X_c$ is capacitive reactance in ohms.

When the current $I_c$ increases, for example after the fluorescent tubes 71 and 72 are struck, the voltage drop $V_c$ across the capacitor 312 increases because of the capacitive reactance, $$V_c = -jX_c \cdot I, \quad (4)$$

where $X_c$ is capacitive reactance in ohms and V and I are phasor representations of a.c. voltage and current.

Figure 4D:
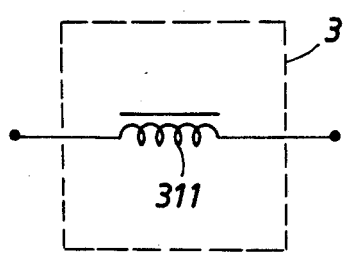
Figure 4D:
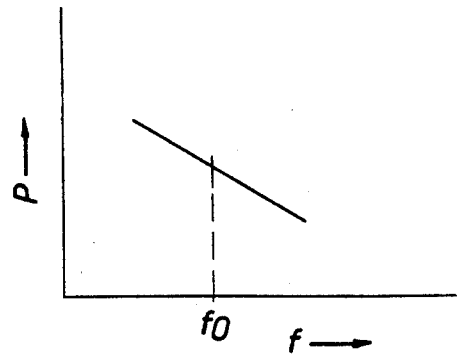

FIG. 4D utilizes only inductor 311. When the current $I_L$ increases, the voltage drop $V_L$ across the inductor 311 increases because of the inductive reactance, $$V_L = (j\omega_o L)I, \quad (5)$$

where $\omega_o L = X_L$, which is inductive reactance in ohms.

Figure 5B:
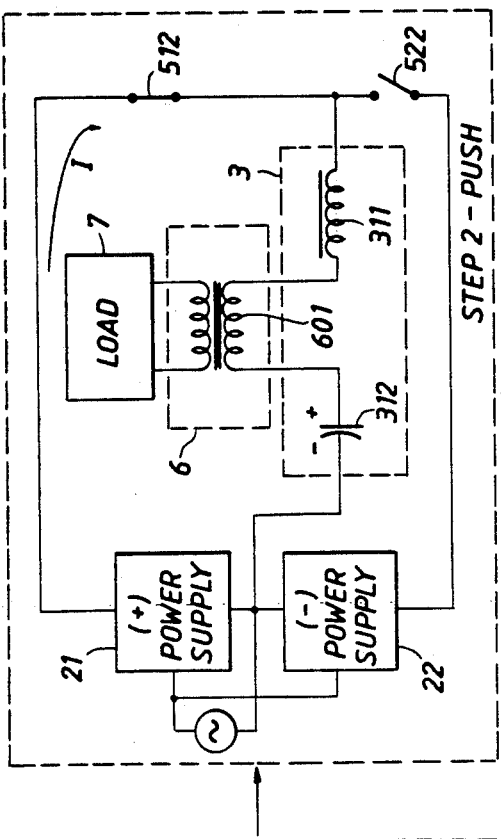
FIGS. 5A-5D illustrate in simplified form how output power control 3 is connected functionally for an alternative transformer embodiment in FIG. 6 wherein FIGS. 5A, B, C and D compare functionally to FIGS. 3A, B, C and D, respectively.
Figure 5C:
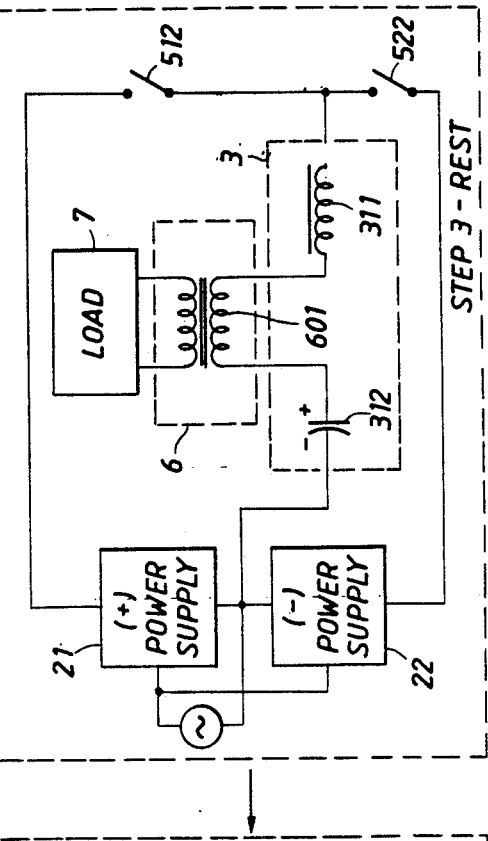
Figure 5A:
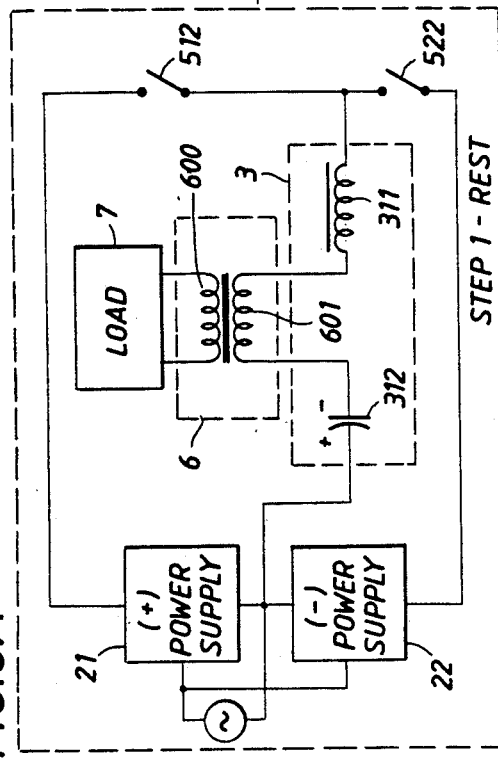
Figure 5D:
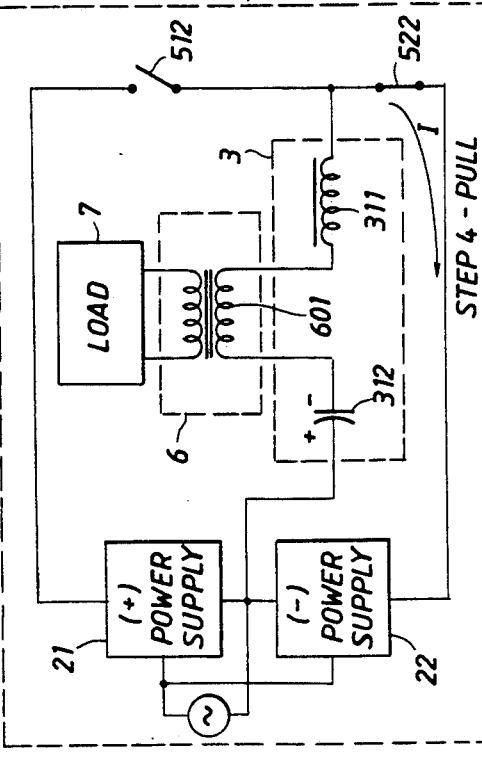
Figure 6:
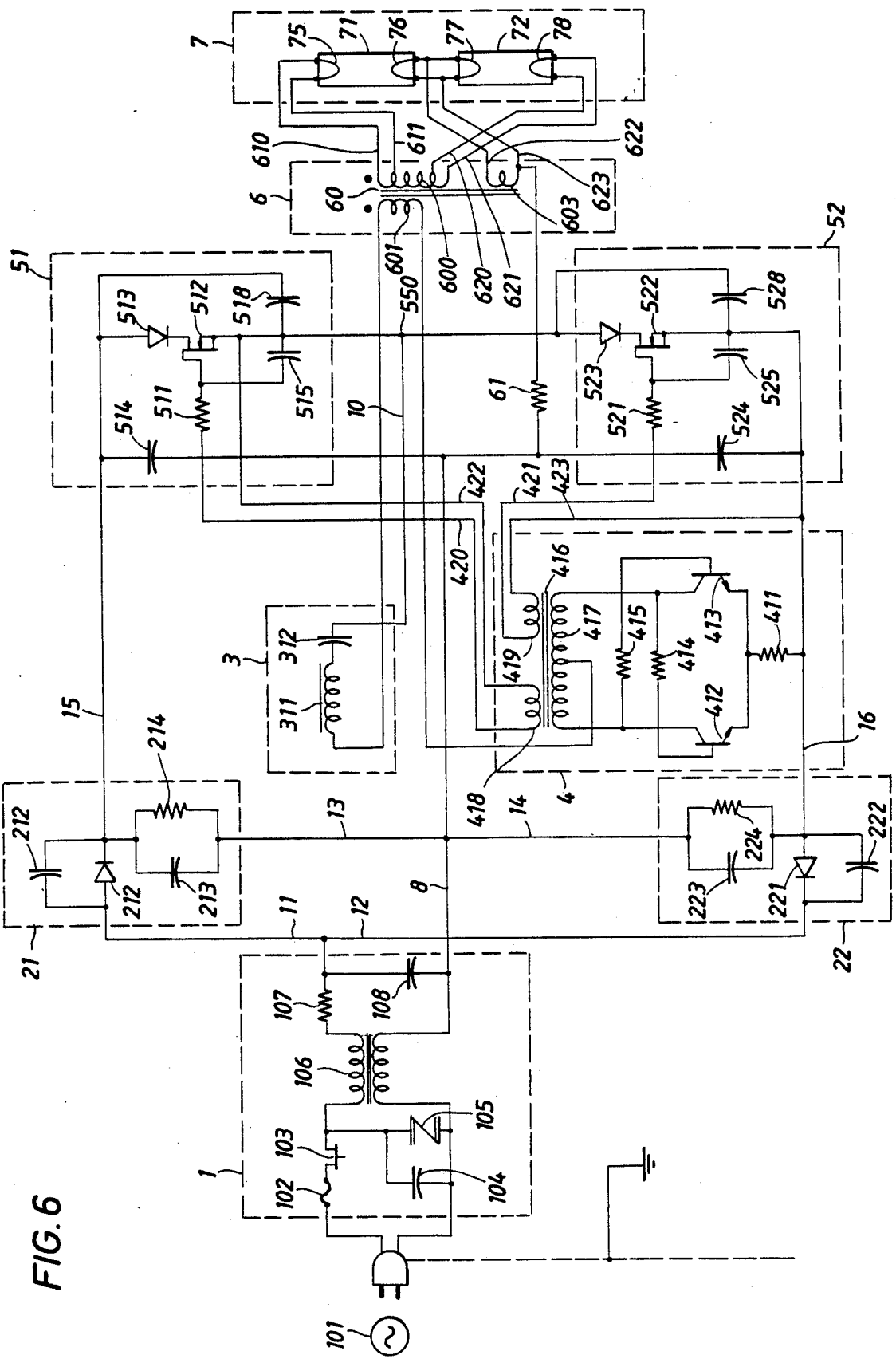
FIG. 6 is a circuit diagram of an alternative transformer embodiment where an output power control circuit is connected functionally per FIGS. 5A, B, C and D.

FIGS. 5 and 6 show an alternative transformer embodiment of the ballast circuit of FIG. 1. FIG. 5 illustrates the different operation steps of the alternative circuit of FIG. 6. FIG. 5 shows that FIG. 6 is a half bridge output transformer arrangement, the input winding of which is placed in series with the series connected reactance circuit or control circuit 3 during the basic switching states.

In FIG. 5A the circuit awaits a command from push-pull control logic 4 to fire output transistor or switch 512. It illustrates the first dead time state analog of the system show in FIG. 6 when power is first applied. FIG. 3E shows the input voltage to transistors 512 and 522 from the switching control logic or oscillator circuit 4 as a function of time and phase and shows where dead time occurs between conduction times of transistors 512 and 522. During dead time, transistors 512 and 522 are off or "open".

In FIG. 5B, transistor 512 conducts; current flows in the primary winding 601 of output transformer 6 and is limited by the response of output power control circuit 3 including series connected inductor 311 and capacitor 312.

In FIG. 5C, the logic circuit 4 switches both transistors 512, 522 off for a sufficient dead time (approximately 2 μs) for all stray charges and fields to fall out and settle as shown in FIG. 5C and as shown in FIG. 3E. This dead time performs the same function as that of the embodiment shown in FIG. 2.

The next "on" state occurs as shown in FIG. 5D when push-pull control logic circuit 4 causes output transistor 522 to conduct. Current now flows through primary winding 601 and output power control 3 in the opposite direction from that of FIG. 5B. The reactances of inductor 311 and capacitor 312 are shown in FIG. 5D. FIG. 3E shows the voltage applied to the gate of transistor 522 at this time and its voltage polarity. The secondary winding 419 in push-pull control logic circuit 4 is phased such that a positive voltage appears on the gate of transistor 522 during this time interval.

Once again the system of FIG. 6 assumes Step 1 of FIG. 5A. This now becomes the next intermediate off-state before the series of switching cycles resume. The dead time lasts for a time sufficient for charges and magnetic fields to fall out. The dead time of FIGS. 5 and 6 is substantially the same for that of FIGS. 2 and 3 which are typical of the control dead time intervals in all embodiments of this invention.

It is important to note that the inductance of primary winding 601 of output transformer 6 is not considered part of the current limiting reactance. The reflected inductance that appears in the primary of transformer 6 is too small to contribute an effective amount of reactance for tuning per Equation 2.

FIG. 6 is the circuit diagram for the alternative embodiment of the invention illustrated by the operating example of FIG. 5. The circuit of FIG. 6 uses a half-bridge to drive a single output transformer primary winding 601 in output transformer 60. Output power control circuit 3 is connected between output junction 550 and output transformer primary winding 601, which is connected to line 8, the power supply neutral. The embodiment shown in FIG. 6 is identical to FIG. 2 in the following areas:

1 — RFI/EMI, surge and spike limiter
21 — Positive Power Supply
22 — Negative Power Supply
3 — Output Power control
4 — Push-Pull Control Logic, and
7 — Load.

Functioning of the embodiment shown in FIG. 6 can most readily be understood through reference to the preceding descriptions of functioning of FIGS. 3E, 5A, 5B, 5C and 5D and, for those parts of the circuit identical to FIG. 2, to the description of operation provided previously.

For both circuit embodiments of FIGS. 2 and 6, taps off the output winding transformer 600 are applied to filaments 75 and 78 via leads 610, 611 and 620, 621. Filaments 76 and 77 of series connected tubes 71, 72 are provided by winding 603 via leads 622 and 623.

Output Transformerless (OTL) Embodiments of the Invention

Figure 7:
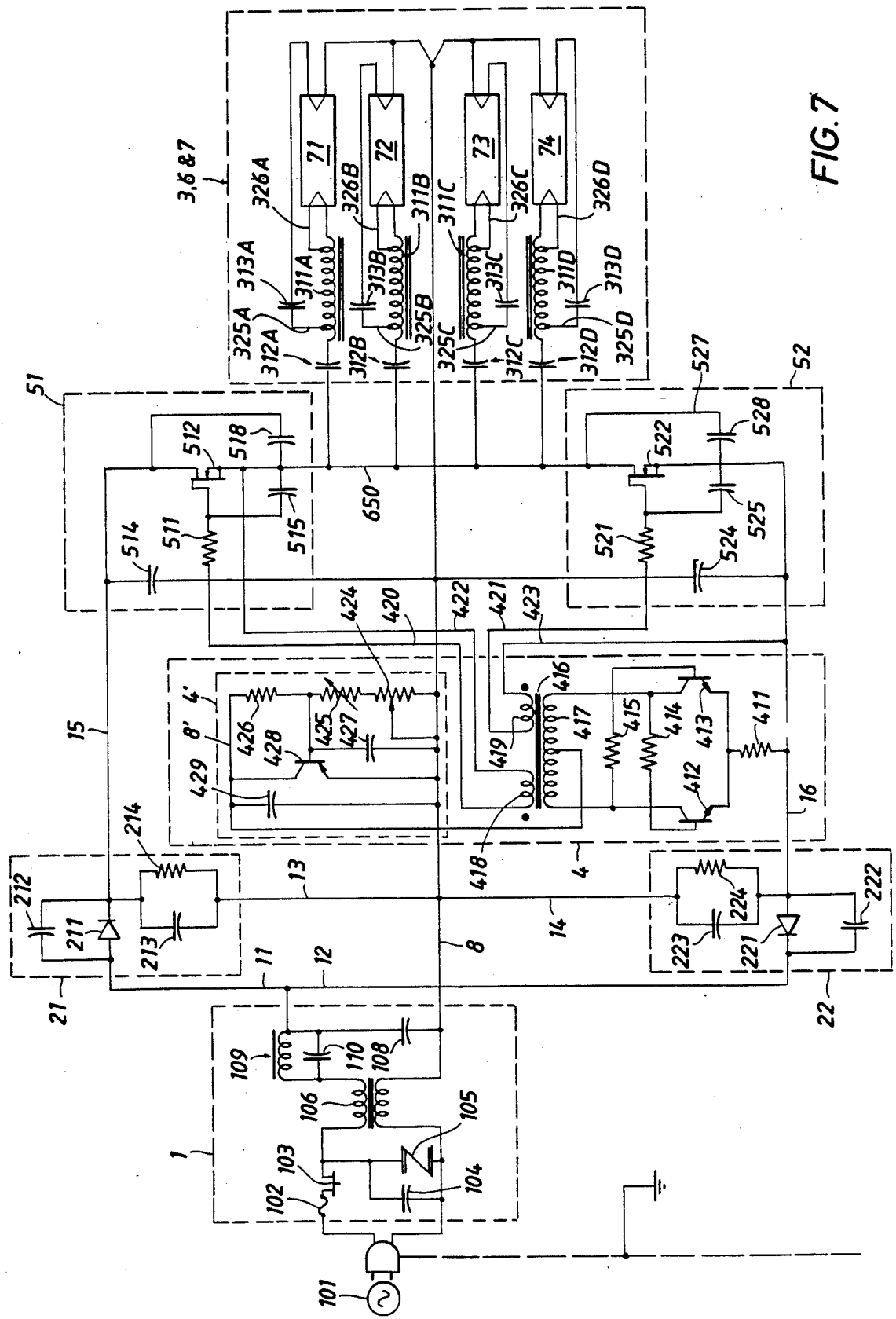
FIG. 7 is a circuit diagram of a transformerless embodiment of the invention which provides a reactance circuit such as a series L-C circuit in series with a fluorescent lamp load between a push pull point and an a.c. neutral line.

FIG. 7 is an OTL version of the circuit of FIG. 1. It is similar to the circuit of FIGS. 2 and 6, but includes no output conditioning transformer. Rather, one or more fluorescent lamps 71, 72, 73, 74 are connected in series with L-C reactance circuits between push-pull point 650 and a.c. neutral line 8.

The functional box labelled 3, 6 & 7 of FIG. 7 includes the functional elements of output power control 3, output conditioner 6 and load identified in FIG. 1. The output power control element 3 includes inductors 311 (A, B, C, D) and capacitors 312 (A, B, C, D) connected in series as reactance circuits. Capacitors 313 (A, B, C, D) provide filament warm-up power to one side of tubes 71, 72, 73, 74 via taps 325 (A, B, C, D) from inductors 311 (A, B, C, D) which act as auto-transformers. Taps 326 (A, B, C, D) provide warm-up power to filaments of the other side of tubes 71, 72, 73, 74. Each lamp 71, etc. and reactance circuit (capacitor 312A, etc. and inductor 311A, etc.) are operated independently of the other lamps even though all are supplied from the same source between push-pull point 650 and a.c. neutral line 8. Additional lamps may be added by incorporating additional output configurations.

The circuit of FIG. 7 differs in two other respects from the circuits of FIGS. 2 and 6. The first regards RFI/EMI surge and Spike Limiter circuit 1. The circuits of block 1 of FIG. 7 are identical to those of FIGS. 2 and 6 except that resistor 107 (FIGS. 2 and 6) has been replaced by choke 109 and capacitor 110 as an alternative way to effect power factor correction.

The second regards power control logic circuit 4 includes a brightness control circuit 4' including series circuit elements resistor 424, potentiometer 425 and resistor 426 connected in parallel with capacitor 429 across a.c. neutral line 8 and line 8'. A transistor 428 has its emitter and collector connected between line 8 and line 8' with its base connected to a capacitor 427 and the connection between resistor 426 and potentiometer 425. The other end of capacitor 427 is connected to a.c. return line 8. In operation, brightness control circuit 4' acts to vary the amplitude of the sinusoidal output of the oscillator including transistors 412, 413 and transformer 416 by varying the d.c. potential applied to it from negative d.c. output circuit 22. Reference to FIG. 3E shows that if the maximum amplitude of the sinusoidal control circuit is reduced, the control signal of output windings 418 and 419 applied respectively to transistor switches 512 and 522 will be in conducting states for relatively shorter periods of time. Consequently, the time of conduction and application of d.c. power to lamps 71, 72, 73, 74 is correspondingly reduced, resulting in a reduction of brightness of such lamps. Accordingly, potentiometer 425 provides a manual brightness control for the circuit of FIG. 7.

Inductor 311A and capacitor 312A are series connected, while start-up capacitor 313A is connected to a tap on inductor 311A to provide start-up current for the lamp filaments. By careful selection of the values of 311A, 312A, and 313A, and by properly selecting the tap connection of 313A, optimum start-up voltage to fluorescent tube 71 results. Each of the tubes 72, 73, 74 includes a similar starter circuit. When the fluorescent tube 71 is in its socket and power to the ballast circuit is turned on, current flows through capacitor 312A and a small part of inductor 311A and then through capacitor 313A via tap 325A and on to the far filament of fluorescent tube 71. At 30 KHz, a capacitance of 0.0075 μF of capacitor C313A offers an impedance of 707 ohms. At 340 volts applied between push pull point 650 and a.c. neutral line 8, approximately ½ ampere of current flows to the far filament of lamp 71, sufficient to operate the inductor 311A as a series-resonant buck voltage-boost circuit to strike fluorescent tube 71. After the tube is struck, it is maintained at steady state operation by the regulating characteristics of LC circuit elements 311, 312 and 313. When a fluorescent tube is removed from its socket, capacitor 313A no longer is in circuit between push pull point 650 and a.c. neutral return 8 because of the absence of the filament of the tube 71. Consequently the starting circuit is rendered inoperative.

Figure 8:
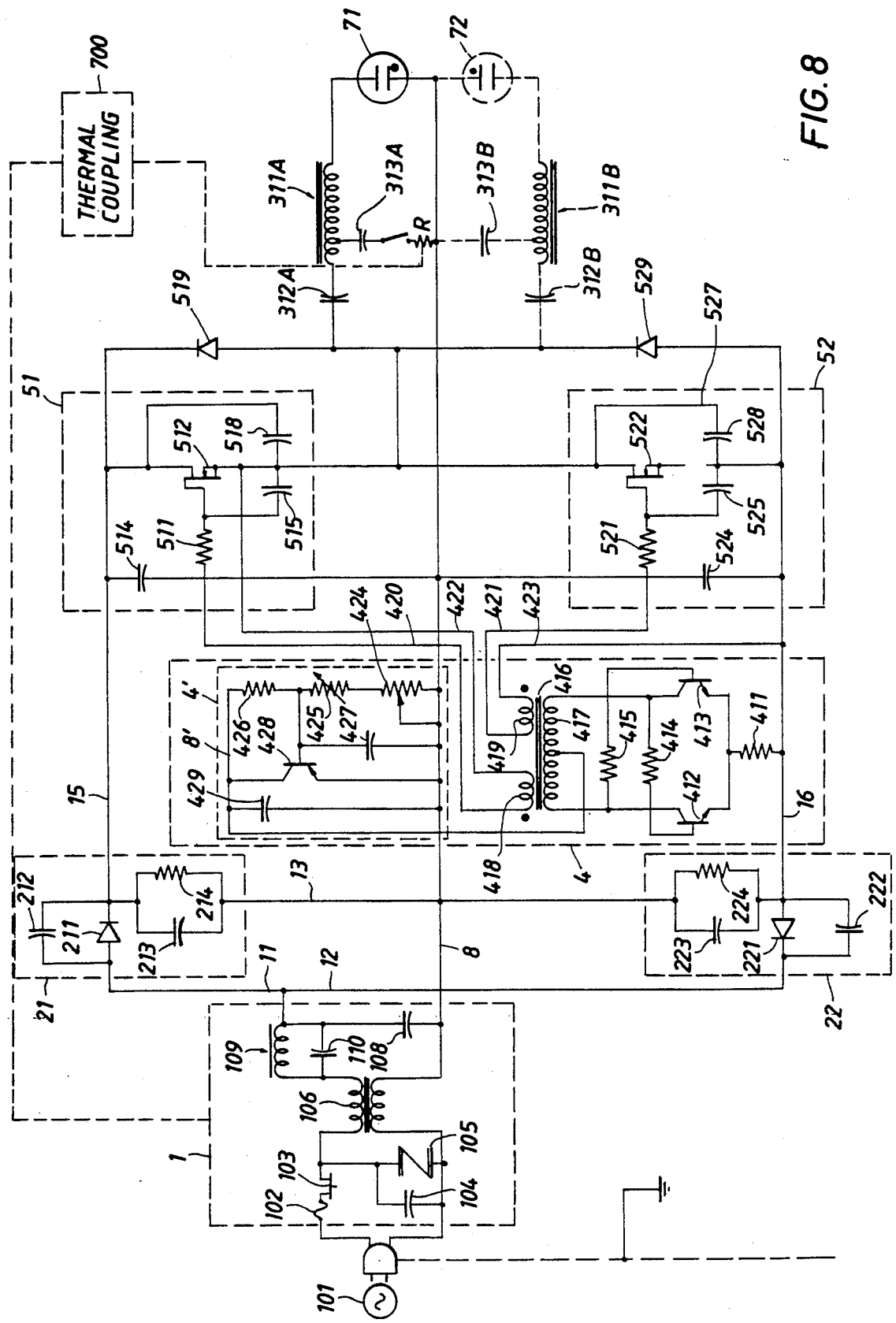
FIG. 8 is a circuit diagram of an alternative transformerless embodiment of the invention which provides a reactance circuit such as a series L-C circuit in series with a discharge lamp such as a mercury vapor or sodium vapor lamp.

The circuit of FIG. 8 is an alternative version of the circuit of FIG. 7 configured to operate mercury vapor, sodium vapor, or metal halide lamps. Startup power through capacitor 312A, a portion of inductor 311A, capacitor 313A and thermal cut-off resistor R causes an increase in voltage across lamp 71 by auto-transformer action in inductor 311A to strike lamp 71. After lamp 71 strikes and warms up to full load, current flow through the startup capacitor 313A reduces significantly. If the bulb 71 is inoperative or missing, thermal cut off resistor R heats up until a temperature is reached whereby it opens two switches: the first associated with the resistor R itself to open the connection between capacitor 313 and a.c. neutral return line 8; the second thermal cut off element 103 (or another such element in series with element 103) via thermal coupling 700. Consequently, power to the entire ballast circuit is removed until thermal cut off resistor R cools down.

When R cools sufficiently, power to the circuit via element 103 is reconnected and the connection of capacitor 313A to a.c. neutral line is reestablished, and starting of lamp 71 is begun once more. Another lamp 72 can be connected between push-pull common point 650 and a.c. neutral line 8 with starter circuits such as that comprising capacitor 312B, inductor 311B and capacitor 313B illustrated in dashed lines. Diodes 519 and 529 are connected across the electronically controlled switches of output circuits 51 and 52 so as to reduce the flyback voltage stress on transistors 512 and 522, but they are not essential to the operation of the circuit.

Various modifications and alterations in the described apparatus will be apparent to those skilled in the art from the foregoing description which does not depart from the spirit of the invention. For this reason, those changes are desired to be included in the scope of the appended claims. The appended claims recite the only limitations of the present invention and the descriptive matter which is employed for setting forth the present embodiment and is to be interpreted as illustrative and not limitative.

What is claimed is:

1. A ballast circuit for a discharge tube comprising, means for supplying a.c. line power including an a.c. high line and an a.c. neutral line,
rectifying means including first rectifying means connected between said a.c. high line and said a.c. neutral line for providing positive d.c. voltage between a positive d.c. line and said a.c. neutral line, and a second rectifying means connected between said a.c. high line and said a.c. neutral line for providing negative d.c. voltage between a negative d.c. voltage line and said a.c. neutral line,
transformer means having oppositely wound first and second input windings and an output winding, said first input winding connected in series with a first electronically controlled switch means to said positive d.c. line and a push-pull common point, said second input winding connected in series with a second electronically controlled switch means to said negative d.c. voltage line and said push-pull common point,
reactance circuit means connected between said push-pull common point and said a.c. neutral line,
electronic control circuit means powered from said rectifying means for generating a high frequency a.c. control signal having first and second half cycles and for closing said first electronically controlled switch means only during said first half cycles of said a.c. control signal and for closing said second electronically controlled switch means only during said second half cycles of said a.c. control signal, and
a discharge tube connected to said output winding of said transformer winding, whereby a.c. voltage is applied to said discharge tube and said circuit functions as a ballast for said discharge tube.

2. The circuit of claim 1 wherein
said reactance circuit means includes a capacitor and an inductor connected in series with each other.

3. The circuit of claim 2 wherein
the reactive power of said reactance circuit means at said frequency of said a.c. control signal of said electronic control circuit means is a few decibels below the maximum reactive power of said reactance circuit stored at its resonant frequency defined by the capacitance of said capacitor and the inductance of said inductor.

4. The circuit of claim 1 wherein
said reactance circuit means includes a capacitor and an inductor connected in parallel with each other.

5. The circuit of claim 4 wherein
the reactive power of said reactance circuit means at said frequency of said a.c. control signal of said electronic control circuit means is a few decibels above the minimum reactive power of said reactance circuit stored at its resonant frequency defined by the capacitance of said capacitor and the inductance of said inductor.

6. The circuit of claim 1 wherein said reactance circuit means is a capacitor.

7. The circuit of claim 1 wherein said reactance circuit means is an inductor.

8. The circuit of claim 1 wherein said means for supplying a.c. line power includes means connected between said a.c. high line and said a.c. neutral line to provide a low impedance short circuit to high frequency noise, radio frequency interference and spike voltages.

9. The circuit of claim 8 further including means connected in series with said a.c. high line and said a.c. neutral line to provide a high impedance to radio frequency interference while offering little impedance to power line frequencies.

10. The circuit of claim 1 wherein said electronic circuit means for generating a high frequency a.c. control signal includes
free running oscillator means including an oscillator transformer with an oscillator primary winding and first and second oppositely wound oscillator secondary windings for generating at said oscillator primary winding said high frequency a.c. control signal, said control signal being a sinusoidal signal with first and second half cycles, said first and second oscillator secondary windings thereby having said sinusoidal control signal induced across their outputs which are one hundred eighty degrees out of phase from each other, and means for applying said control signal of said first oscillator secondary winding to said first electronically controlled switch means and means for applying said control signal of said second oscillator secondary winding to said second electronically controlled switch means, whereby said first electronically controlled switch means is closed only during first half cycles of said sinusoidal control signal and said second electronically controlled switch means is closed only during second half cycles of said sinusoidal control signal.

11. The circuit of claim 10 wherein said first switch means is a first transistor means which electrically connects said first input winding of said transformer means to said push-pull common point only during first half cycles of said sinusoidal signal, and said second switch means is a second transistor means which electrically connects said second input winding of said transformer means to said push-pull common point only during second half cycles of said sinusoidal signal.

12. The circuit of claim 11 wherein said first transistor means conducts only during a portion of said first half cycle of said sinusoidal signal and said second transistor means conducts only during a portion of said second half cycle of said sinusoidal signal.

13. The circuit of claim 12 wherein said first transistor means conducts only during a push time period of said first half cycle of said sinusoidal signal when such signal is greater than a positive threshold value, and said second transistor means conducts only during a pull time period of said second half cycle of said sinusoidal signal when such signal is less than a negative threshold value, whereby current is applied to said first input winding in one direction during said push period of said sinusoidal push-pull signal, current is applied to said second input winding in an opposite direction during said pull period, and no current is applied to said first input winding or said second input winding during a rest period between said push period and said pull period when said first half cycle of said sinusoidal signal is below said positive threshold value or said second half cycle of said sinusoidal signal is greater than said negative threshold value.

14. The circuit of claim 1 wherein said discharge tube is a fluorescent tube.

15. A ballast circuit for a discharge tube comprising means for supplying a.c. line power including an a.c. high line and an a.c. neutral line, rectifying means including first rectifying means connected between said a.c. high line and said a.c. neutral line for providing positive d.c. voltage between a positive a.c. line and said a.c. neutral line, and second rectifying means connected between said a.c. high line and said a.c. neutral line for providing negative d.c. voltage between a negative voltage line and said a.c. neutral line, reactance circuit means connected in series with a primary winding of a transformer means between said a.c. neutral line and a push-pull common point, said transformer means including an output winding, a first electronically controlled switch means connected between said positive d.c. line and said push-pull common point, a second electronically controlled switch means connected between said negative d.c. line and said push-pull common point, electronic control circuit means powered from said rectifying means for generating a high frequency a.c. control signal having first and second half cycles for closing said first electronically controlled switch means only during said first half cycles of said a.c. control signal and for closing said second electronically controlled switch means only during said second half cycles of said a.c. control signal, and a discharge tube connected to said output winding of said transformer output winding.

16. The ballast circuit of claim 15 wherein said reactance circuit means includes a capacitor and an inductor connected in series with each other.

17. The ballast circuit of claim 15 wherein said reactance circuit means includes a capacitor and an inductor connected in parallel with each other.

18. The ballast circuit of claim 15 wherein said means for supplying a.c. line power includes means connected between said a.c. high line and said a.c. neutral line to provide a low impedance short circuit to high frequency noise, radio frequency interference and spike voltages.

19. The ballast circuit of claim 18 further including means connected in series with said a.c. high line and said a.c. neutral line to provide a high impedance to radio frequency interference while offering little impedance to power line frequencies.

20. The ballast circuit of claim 15 wherein said electronic circuit means for generating a high frequency a.c. control signal includes free running oscillator means including an oscillator transformer with an oscillator primary winding and first and second oppositely wound oscillator secondary windings for generating at said oscillator primary winding said high frequency a.c. control signal, said control signal being a sinusoidal signal with first and second half cycles, said first and second oscillator secondary windings thereby having said sinusoidal control signal induced across their outputs which are one hundred eighty degrees out of phase from each other, and means for applying said control signal of said first oscillator secondary winding to said first electronically controlled switch means and means for applying said control signal of said second oscillator secondary winding to said second electronically controlled switch means, whereby said first electronically controlled switch means is closed only during first half cycles of said sinusoidal control signal and said second electronically controlled switch means is closed only during second half cycles of said sinusoidal control signal.

21. A power circuit for providing high frequency alternating current power to a discharge tube comprising, transformer means including input winding means and output winding means, reactance circuit means connected in series with said input winding means, means for generating a high frequency control signal having first and second half cycles, means for applying d.c. current in one direction through said series connected reactance means and said input winding means during said first half cycles of said control signal and for applying d.c. current in an opposite direction through said series connected reactance circuit means and said input winding means during said second half cycles of said control signal thereby producing alternating current power across said output winding means, and a discharge tube connected across said output winding means of said transformer means, whereby said power circuit functions as a ballast circuit for said tube.

22. The circuit of claim 21 wherein said reactance circuit includes a capacitor and an inductor connected in series with each other and wherein said tube is a fluorescent tube.

23. The power circuit of claim 21 wherein said reactance circuit includes a capacitor and an inductor connected in parallel with each other and wherein said tube is a fluorescent tube.

24. The power circuit of claim 21 wherein said reactance circuit is a capacitor.

25. The power circuit of claim 21 wherein said reactance circuit is an inductor.

26. The circuit of claim 25 wherein said means for supplying a.c. line power includes means connected between said a.c. high line and said a.c. neutral line to provide a low impedance short circuit to high frequency noise, radio frequency interference and spike voltages.

27. The circuit of claim 26 further including means connected in series with said a.c. high line and said a.c. neutral line to provide a high impedance to radio frequency interference while offering little impedance to power line frequencies.

28. The power circuit of claim 21 wherein said means for applying d.c. current includes means for supplying a.c. line power including an a.c. high line and an a.c. neutral line, rectifying means including first rectifying means connected between said a.c. high line and said a.c. neutral line for providing positive d.c. voltage between a positive d.c. line and said a.c. neutral line, and second rectifying means connected between said a.c. high line and said a.c. neutral line for providing negative d.c. voltage between a negative voltage line and said a.c. neutral line, means for connecting one end of said series connected reactance circuit means and said input winding means to said a.c. neutral line, first switch means connected between said positive d.c. line and an opposite end of said series connected reactance circuit means and said input winding means, second switch means connected between said negative d.c. line and said opposite end of said series connected reactance circuit means and said input winding means, means for closing said first switch means during first half cycles of said control signal, and means for closing said second switch means during second half cycles of said control signal.

29. The power circuit of claim 28 wherein said input winding means of said transformer means is a single winding.

30. The power circuit of claim 28 wherein said input winding means includes, a first input winding wound in one direction and connected to said first switch means, a second input winding wound in a direction opposite to that of said first input winding and connected to said second switch means.

31. The power circuit of claim 21 wherein said output winding means includes winding filament means for generating filament voltage, and said power circuit further including means for applying said filament voltage to a heating filament of said discharge tube.

32. A power circuit for providing high frequency power to a discharge tube comprising, means for supplying a.c. line power including an a.c. high line and an a.c. neutral line, rectifying means including first rectifying means connected between said a.c. high line and a.c. neutral line for providing positive d.c. voltage between a positive d.c. line and said a.c. neutral line, and a second rectifying means connected between said a.c. high line and said a.c. neutral line for providing negative d.c. voltage between a negative d.c. voltage line and said a.c. neutral line, a discharge tube, a reactance circuit, electronic control circuit means powered from said rectifying means for generating a high frequency a.c. control signal having first and second half cycles, a first electronically controlled means responsive to said control signal for effectively connecting said discharge tube and said reactance circuit means in series between said positive d.c. line and said a.c. neutral line only during said first half cycles of said high frequency a.c. control signal, and a second electronically controlled circuit means responsive to said control signal for effectively connecting said discharge tube and said reactance circuit means in series between said negative d.c. line and said a.c. neutral line only during said second half cycles of said high frequency a.c. control signal, thereby applying high frequency power to said discharge tube, whereby said power circuit functions as a ballast circuit for said discharge tube.

33. The circuit of claim 32 wherein said first electronically controlled circuit means includes electronically controlled first switch means connected between said positive d.c. line and a push pull point, said second electronically controlled circuit means includes electronically controlled second switch means connected between said negative d.c. line and said push-pull point, and said reactance circuit and said discharge tube are connected in series between said push-pull point and said a.c. neutral line.

34. The circuit of claim 33 wherein said discharge tube is a fluorescent bulb.

35. The circuit of claim 34 wherein said reactance circuit is a capacitor and an inductor connected in series.

36. The circuit of claim 35 wherein said inductor is tapped, including winding taps disposed near each of its first and second ends, said first end of said inductor being connected to said capacitor of said reactance circuit, said second end of said inductor being connected to a first end of said fluorescent bulb, said winding tap disposed near said second end of said inductor being connected to a filament at said first end of said bulb, said winding tap disposed near said first end of said inductor being connected via a capacitor to a filament at a second end of said fluorescent bulb.

37. The circuit of claim 33 further comprising an additional load and an additional reactance circuit connected in series with each other between said push pull point and said a.c. neutral line.

38. The circuit of claim 33 wherein said discharge tube is a sodium vapor lamp.

39. The circuit of claim 38 wherein said reactance circuit is a capacitor and a tapped inductor connected in series, and further including a shunt capacitor connected between a tap of said inductor and said a.c. neutral line.

40. The circuit of claim 39 further comprising a thermal cutoff resistor in series with said shunt capacitor, a thermal cutoff element in series with said a.c. high line, and thermal coupling between said thermal cutoff resistor and said thermal cutoff element, whereby if said lamp is inoperative or missing, said resistor heats due to current flowing in it causing it to open said series connection between said shunt capacitor and said a.c. neutral line, said heating of said resistor via said thermal coupling causing said thermal cutoff element to open said a.c. high line.

41. The circuit of claim 33 wherein said discharge tube is a mercury vapor lamp.

42. The circuit of claim 41 wherein said reactance circuit is a capacitor and a tapped inductor connected in series, and further including a shunt capacitor connected between a tap of said inductor and said a.c. neutral line.

43. The circuit of claim 32 wherein
said first electronically controlled circuit means includes electronically controlled first switch means connected in series with a first primary winding means of a transformer means, said first switch means and said first primary winding means connected between said positive d.c. line and a push pull point, said load being connected to a secondary winding means of said transformer means such that said load is electrically effectively in series with said first primary winding means during said first half cycles of said control signal, said reactance circuit being connected between said push pull point and said a.c. neutral line, and
said second electronically controlled circuit means includes electronically controlled second switch means connected in series with a second primary winding of said transformer means, said second switch means and said second primary winding means connected between said negative d.c. line and said push-pull point, whereby said load is electronically effectively in series with said second primary winding means during said second half cycles of said control signal.

44. The circuit of claim 32 wherein
said first electronically controlled circuit means includes electronically controlled first switch means connected between said positive d.c. line and a push pull point,
said second electronically controlled circuit means includes electronically controlled second switch means connected between said negative d.c. line and said push pull point, and
said reactance circuit connected in series with primary winding means of a transformer means to form a reactance circuit — primary winding means series circuit, said series circuit connected between said push pull point and said a.c. neutral line,
said load being connected to a secondary winding means of said transformer means such that said load is electrically effectively in series with said primary winding means.

45. The circuit of claim 32 wherein
said electronic control circuit means includes brightness control means for varying the time during said first half cycles of said control signal when said load and said reactance circuit are connected between said negative d.c. line and said a.c. neutral line.

* * * * *